United States Patent
Hydrie et al.

(10) Patent No.: US 7,836,511 B2
(45) Date of Patent: Nov. 16, 2010

(54) ENFORCING ADVERTISEMENT PLAYBACK FOR DOWNLOADED MEDIA CONTENT

(75) Inventors: Aamer Hydrie, Seattle, WA (US); Eduardo P. Oliveira, Redmond, WA (US); Bruno Kraychete da Costa, Redmond, WA (US); Paulo Henrique Cavalcante Lisboa, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1036 days.

(21) Appl. No.: 11/424,208

(22) Filed: Jun. 14, 2006

(65) Prior Publication Data

US 2007/0294772 A1 Dec. 20, 2007

(51) Int. Cl.
*G06F 7/04* (2006.01)
*G06F 17/30* (2006.01)
*H04N 7/16* (2006.01)

(52) U.S. Cl. ....................................................... 726/27
(58) Field of Classification Search .................... 726/27
See application file for complete search history.

(56) References Cited

U.S. PATENT DOCUMENTS

| | | |
|---|---|---|
| 5,774,170 A | 6/1998 | Hite et al. |
| 5,838,314 A | 11/1998 | Neel et al. |
| 6,035,329 A | 3/2000 | Mages et al. |
| 6,055,566 A | 4/2000 | Kikinis |
| 6,119,098 A | 9/2000 | Guyot et al. |
| 6,463,468 B1 | 10/2002 | Buch et al. |
| 6,697,944 B1 | 2/2004 | Jones et al. |
| 6,698,020 B1 | 2/2004 | Zigmond et al. |
| 6,704,930 B1 | 3/2004 | Eldering et al. |
| 6,760,916 B2 | 7/2004 | Holtz et al. |
| 6,944,877 B1 | 9/2005 | Lord et al. |
| 6,988,277 B2 | 1/2006 | Kovac et al. |
| 6,992,728 B2 | 1/2006 | Takagi et al. |
| 6,993,553 B2 | 1/2006 | Kaneko et al. |
| 7,003,478 B1 | 2/2006 | Choi |
| 7,093,296 B2 | 8/2006 | Nusser et al. |
| 2001/0014876 A1 | 8/2001 | Miyashita |
| 2001/0042249 A1 | 11/2001 | Knepper et al. |
| 2002/0023164 A1 | 2/2002 | Lahr |
| 2002/0068525 A1 | 6/2002 | Brown et al. |

(Continued)

FOREIGN PATENT DOCUMENTS

WO 2005057346 A2 6/2005

OTHER PUBLICATIONS

Kulesh et al., "Video Clip Recognition Using Joint Audio-Visual Processing Model," 2002 IEEE, pp. 500-503, http://csd12.computer.org/persagen/DLAbsToc.jsp?resourcePath=/dl/proceedings/&toc=comp/proceedings/icpr/2002/1695/0/11695toc.xml&DOI=10.1109/ICPR.2002.1044776.

(Continued)

*Primary Examiner*—Kambiz Zand
*Assistant Examiner*—Stephen Sanders
(74) *Attorney, Agent, or Firm*—Senniger Powers LLP

(57) ABSTRACT

Enforcing rendering advertisements and other predetermined media content in connection with playback of downloaded selected media content. Playback of selected media content is made conditional on acquisition of a playback token that is generated in response to playback of the predetermined content. The playback token may be implemented as a digital rights management (DRM) license acquired in response to playback of the predetermined content. Another aspect involves a content insertion engine for inserting ads or other predetermined content into the playback of downloaded content.

19 Claims, 6 Drawing Sheets

U.S. PATENT DOCUMENTS

| | | |
|---|---|---|
| 2002/0097979 A1 | 7/2002 | Lowthert et al. |
| 2002/0116269 A1 | 8/2002 | Ishida |
| 2002/0120564 A1 | 8/2002 | Strietzel |
| 2002/0141584 A1 | 10/2002 | Razdan et al. |
| 2002/0146237 A1 | 10/2002 | Safadi |
| 2002/0169540 A1 | 11/2002 | Engstrom |
| 2002/0178443 A1 | 11/2002 | Ishii |
| 2002/0194151 A1 | 12/2002 | Fenton et al. |
| 2003/0012549 A1 | 1/2003 | Ohnuma |
| 2003/0037068 A1 | 2/2003 | Thomas et al. |
| 2003/0065712 A1 | 4/2003 | Cheung et al. |
| 2003/0177490 A1 | 9/2003 | Hoshino et al. |
| 2003/0204519 A1 | 10/2003 | Sirivara et al. |
| 2004/0086120 A1 | 5/2004 | Akins, III et al. |
| 2004/0139027 A1 | 7/2004 | Molaro |
| 2004/0226034 A1 | 11/2004 | Kaczowka et al. |
| 2004/0226051 A1 | 11/2004 | Carney et al. |
| 2004/0243834 A1* | 12/2004 | Stefik et al. ............ 713/200 |
| 2005/0021403 A1 | 1/2005 | Ozer et al. |
| 2005/0022019 A1 | 1/2005 | Medvinsky et al. |
| 2005/0086695 A1 | 4/2005 | Keele et al. |
| 2005/0097608 A1 | 5/2005 | Penke et al. |
| 2005/0114526 A1 | 5/2005 | Aoyama |
| 2005/0114896 A1* | 5/2005 | Hug et al. ............ 725/88 |
| 2005/0149450 A1* | 7/2005 | Stefik et al. ............ 705/58 |
| 2005/0180734 A1 | 8/2005 | Ochiai et al. |
| 2005/0216763 A1 | 9/2005 | Lee et al. |
| 2005/0227679 A1 | 10/2005 | Papulov |
| 2005/0227773 A1 | 10/2005 | Lu et al. |
| 2005/0262528 A1 | 11/2005 | Herley et al. |
| 2005/0262546 A1 | 11/2005 | Murase et al. |
| 2005/0278230 A1 | 12/2005 | Shirasaka et al. |
| 2005/0278629 A1 | 12/2005 | Chailleux |
| 2005/0289588 A1 | 12/2005 | Kinnear |
| 2006/0008256 A1 | 1/2006 | Khedouri et al. |
| 2006/0021068 A1 | 1/2006 | Xu et al. |
| 2006/0026655 A1 | 2/2006 | Perez |
| 2006/0036495 A1 | 2/2006 | Aufricht et al. |
| 2006/0041638 A1 | 2/2006 | Whittaker et al. |
| 2006/0059095 A1 | 3/2006 | Akins, III et al. |
| 2006/0085816 A1 | 4/2006 | Funk et al. |
| 2006/0094406 A1 | 5/2006 | Cortegiano |
| 2006/0212347 A1 | 9/2006 | Fang et al. |
| 2006/0259926 A1 | 11/2006 | Scheelke et al. |
| 2007/0098165 A1* | 5/2007 | Yoshikawa ............ 380/211 |
| 2007/0124201 A1 | 5/2007 | Hu et al. |
| 2007/0136742 A1 | 6/2007 | Sparrell |

OTHER PUBLICATIONS

Dedrick, "A Consumption Model for Targeted Electronic Advertising," Intel Architecture Labs, 1995 IEEE, pp. 41-49, http://csdl2.computer.org/persagen/DLAbsToc.jsp?resourcePath=/dl/mags/mu/&toc=comp/mags/mu/1995/02/u2toc. xml&DOI=10.1109/93.388205.

Parsons et al., "Messages in the Medium: An Experimental Investigation of Web Advertising Effectiveness and Attitudes toward Web Content," 2000 IEEE, 10 pgs., http://csdl2.computer.org/persagen/DLAbsToc.jsp? resourcePath=/dl/proceedings/&toc=comp/proceedings/hicss/2000/0493/06/0493toc.xml&DOI=10.1109/HICSS.2000.926871.

Brooks Barnes, "Disney Will Offer Many TV Shows Free on the Web," The Wall Street Journal, Apr. 10, 2006, 2 pgs., vol. CCXLVII No. 83.

Unknown, "Lightningcast: Experience Manager for Downloaded Video," May 26, 2005, 8 pgs., http://www.lightningcast.com/pdfs/Experience_Manager_Product_White_Paper.pdf.

Unknown, "Windows Media 9 Series," 2002, 2 pgs., http://astream.net/html/wm9_Datasheet_HR.pdf.

Randal C. Picker, "The Digital Video Recorder: Unbundling Advertising and Content," Sep. 10, 2003, 23 pgs., http://picker.uchicago.edu/Papers/PickerDVR.pdf.

Unknown, "Disney Uses iPods for Ads," Red Herring, Nov. 28, 2005, 3 pgs., http://www.redherring.com/ Article.aspx?a=14612&hed=Disney+Uses+iPods+for+Ads&sector=Industries&subsector=InternetAndServices.

Unknown, "On-Demand Advertising," Koeppel Interactive, 3 pgs., http://www.koeppelinteractive.com/On_Demand_Advertising.html.

Unknown, AdCatalog (Ad Management Solution), DG Systems, 1 pg., http://www.dgsystems.com/products_services/adcatalog.html.

* cited by examiner

ENFORCING ADVERTISEMENT PLAYBACK FOR DOWNLOADED MEDIA CONTENT

BACKGROUND

Conventional delivery of video programming involves distributing video content to users via terrestrial, cable, and satellite systems. With the advent of faster Internet connection speeds and greater bandwidth, increasing numbers of users are accessing video content online. Video on demand systems allow users to access video content over a global communications network, such as the Internet, and watch selected content on their computers, portable computing devices, and the like. Typical video on demand, or online video, services stream this video content to users over the network for viewing while the video is being transferred to their computing devices.

Much like conventional video delivery, advertising provides a major source of revenue for online video services. These online services often provide short streaming video clips with advertisements inserted at the beginning of the desired video content. Because a video stream is generated at the website's server, the online video service can exercise full control over the insertion of video ads into the stream. Moreover, the user cannot circumvent watching streaming video ads because their insertion is server-based.

A major limitation on streaming video is that the quality of the video content is limited by the bandwidth of the user's connection. This bandwidth can be quite constrained and, thus, the video quality tends to be limited. Recently, some video content providers allow users to download video content for viewing on their computing devices after completion of the download. Downloading a video file in its entirety to the user's computing device allows the user to obtain higher quality video content and, thus, improves user experience.

Although downloading video content can provide certain advantages over streaming video, it presents problems in the enforcement of ad delivery and insertion. In particular, ads that are inserted locally are much more vulnerable to circumvention by the user. Thus, the mechanism used to insert ads must be immune to circumvention by the user.

SUMMARY

Embodiments of the invention overcome one or more deficiencies in known online video services and media player systems by enforcing the delivery of advertisements and other predetermined media content in connection with downloaded media content. Advantageously, aspects of the invention utilize tokens to enforce playback of advertisements in an online video service. In this manner, playback of selected media content may be made conditional on acquisition of a playback token that is generated in response to playback of the predetermined ad content. Another aspect of the invention involves a content insertion engine for inserting ads or other predetermined content into the playback of downloaded content.

In one aspect of the invention, the playback tokens may be implemented as digital rights management (DRM) licenses in a DRM system. For example, the DRM system requires the presence of a license that is acquired in response to the playing of the predetermined media content before allowing playback of the downloaded media file selected by the user.

Computer-readable media having computer-executable instructions for enforcing ad playback in connection with downloaded video embody further aspects of the invention. Alternatively, embodiments of the invention may comprise various other methods and apparatuses.

Other features will be in part apparent and in part pointed out hereinafter.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
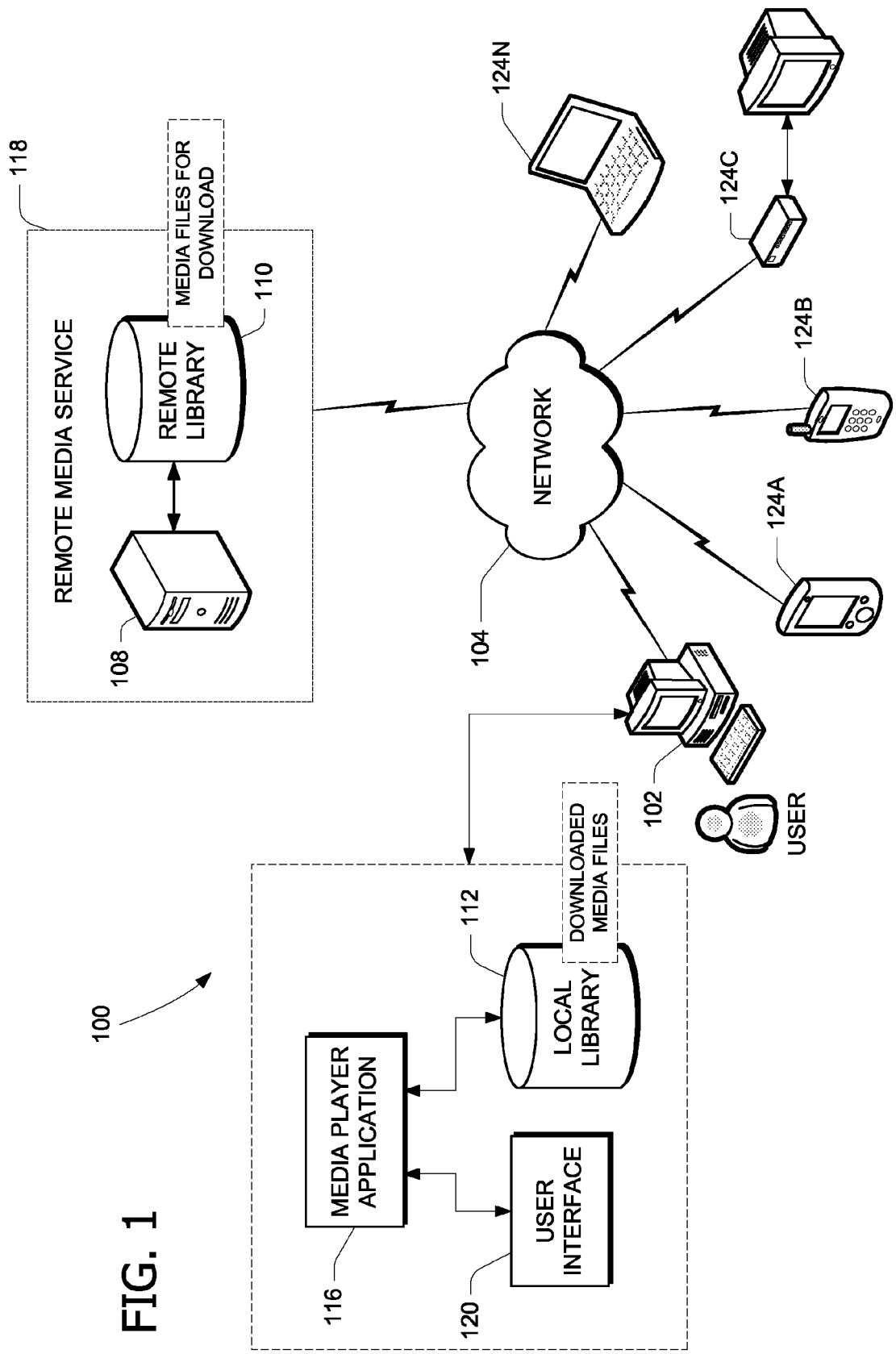
FIG. 1 is a block diagram illustrating one example of a suitable computing system environment in which aspects of the invention may be implemented.

Referring now to the drawings, FIG. 1 illustrates an exemplary computing environment in which embodiments of the present invention may be implemented for enforcing the rendering of predetermined media content to the user of a download media content service. As described in detail below, aspects of the invention make playback of user-selected media content conditional on acquisition of a playback token that is generated in response to the rendering of advertisements or other predetermined content to the user. In one embodiment, playback of a video advertising, for example, causes a token to be generated for decrypting encrypted video content and, thus, enabling it for playback to the user. In an alternative embodiment, the playback tokens may be implemented as DRM licenses in a DRM system. In this embodiment, the DRM system requires that a license be present in response to the rendering of the predetermined content before allowing playback of the selected content. In other words, the playback token may be a DRM license where presence of the license allows playback to proceed and where absence of the license prevents playback.

Although described primarily in the context of video media files, aspects of the invention may be applied to various forms of digital media, including video and multimedia files (e.g., movies, movie trailers, television shows, etc.), audio files (e.g., music tracks, news reports, audio web logs, audio books, speeches, comedy routines, etc.), media broadcasts (e.g., webcasts, podcasts, audiocasts, videocasts, video blogs, blogcasts, etc.), and images.

In FIG. 1, a media system 100 includes one or more client computing devices such as a computer 102 coupled to a data communication network 104. One or more server computers 108 are also coupled to the network 104. As shown, the system 100 includes a memory area, illustrated here as a database 110 associated with server 108. The computer 102 may access the server 108 (and the information in the database 110) via network 104. As an example, network 104 is the Internet (or the World Wide Web) but aspects of the present invention may be applied to any data communication network. Server 108 and computer 102 communicate in the illustrated embodiment using, for example, the hypertext transfer protocol (HTTP).

Referring further to FIG. 1, the user's computer 102 can access one or more digital media files stored locally in the form of, for example, a local media library 112. For instance, the digital media files contain video or other media content downloaded from database 110 and adapted for rendering on computer 102. The local media library 112 may reside on the computer's hard drive, a removable computer-readable storage medium, or the like. In the illustrated embodiment, computer 102 executes a playback engine, such as a media player application 116, for rendering selected media files from local media library 112. Those skilled in the art are familiar with such software routines that, when executed by a computer, render media content and retrieve, store, and display contextual information. The media player application 116 may be any suitable media player that is configured to play digital media so that a user can experience the content that is embodied on the media. For example, a media player application embodying aspects of the invention may be built on Microsoft Corporation's Windows Media™ Player program.

Aspects of the invention also include communication between the media player application 116 executed on computer 102 and one or more remote media services 118. For example, the remote media service 118 is an online video or video on demand service that provides video content such as television programs, movies, video clips, and the like for downloading and viewing by the user. In one embodiment, an online media content provider such as remote media service 118 utilizes one or more servers 108 for maintaining a catalog of available media files, that is, a remote library, in database 110. Those skilled in the art are familiar with such services from which a user may download media files and/or stream them via the Internet, usually for a monthly subscription price or on a per-file basis. For example, the remote library contains the inventory of the online media content provider.

The system 100 of FIG. 1 permits the user to render a downloaded media file on an enabled media playing device (e.g., computer 102 running Microsoft® Windows® operating system and Windows Media™ Player program)

A user interface 120 associated with media player application 1 16 communicates information to the user and receives instructions and feedback from the user. In one embodiment, media player application 1 16 is responsive to user input via the user interface 120 for selecting media content from remote media service 118 for downloading to computer 102 and performing one or more media player operations. In addition to playback or transport controls, typical media player operations include, for example: displaying metadata associated with the media files; rendering, copying, or downloading selected media files; rendering samples of selected media files; assigning media files to one or more playlists; searching or sorting the media files according to their metadata or content; displaying media library contents; scrolling through the media library contents; and displaying contextual menus of available media player operations. Other user interfaces different from those described above are contemplated as within the scope of the claimed invention. Those skilled in the art are familiar with a variety of input devices that may be connected to computer 102 for receiving input via user interface 120.

The media system 100 implements ad enforcement in accordance with aspects of the invention. As described above, computer 102 executes media player application 116 for rendering one or more media files. In this instance, local library 112, which may be stored on the hard drive of computer 102 or a removable storage device associated with the computer, contains one or more media files. In addition, remote library 110 contains one or more media files. Although library 110 is remote from computer 102, its media files are accessible by media player application 116 via network 104. The system 100 operates on one or more media items selected from a collection or multiple collections (e.g., library 112 and/or library 110) of media items selected for consumption by the user. Although sometimes referred to as a playback, it is to be understood that media player application 116 may render media files not only by playing but also by other means (e.g., viewing, accessing, etc.).

Referring again to FIG. 1, in an alternative embodiment of the present invention, a remote computing device 124 executes media player application 116, or a reduced version of media player application 116, for rendering selected media content. The remote computing device 124 may be a portable device such as a PDA 124A, mobile phone 124B, network media player or gaming system 124C (and associated monitor), laptop computer 124N, or the like. Although illustrated as communicating via network 104, it is to be appreciated that a number of wired and wireless network formats are available enabling communication between local computer 102 and remote computer 124.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, PoP devices, mobile telephones, network PCs, minicomputers, mainframe computers, distributed computing environments that include any of the above systems or devices, and the like.

Figure 2:
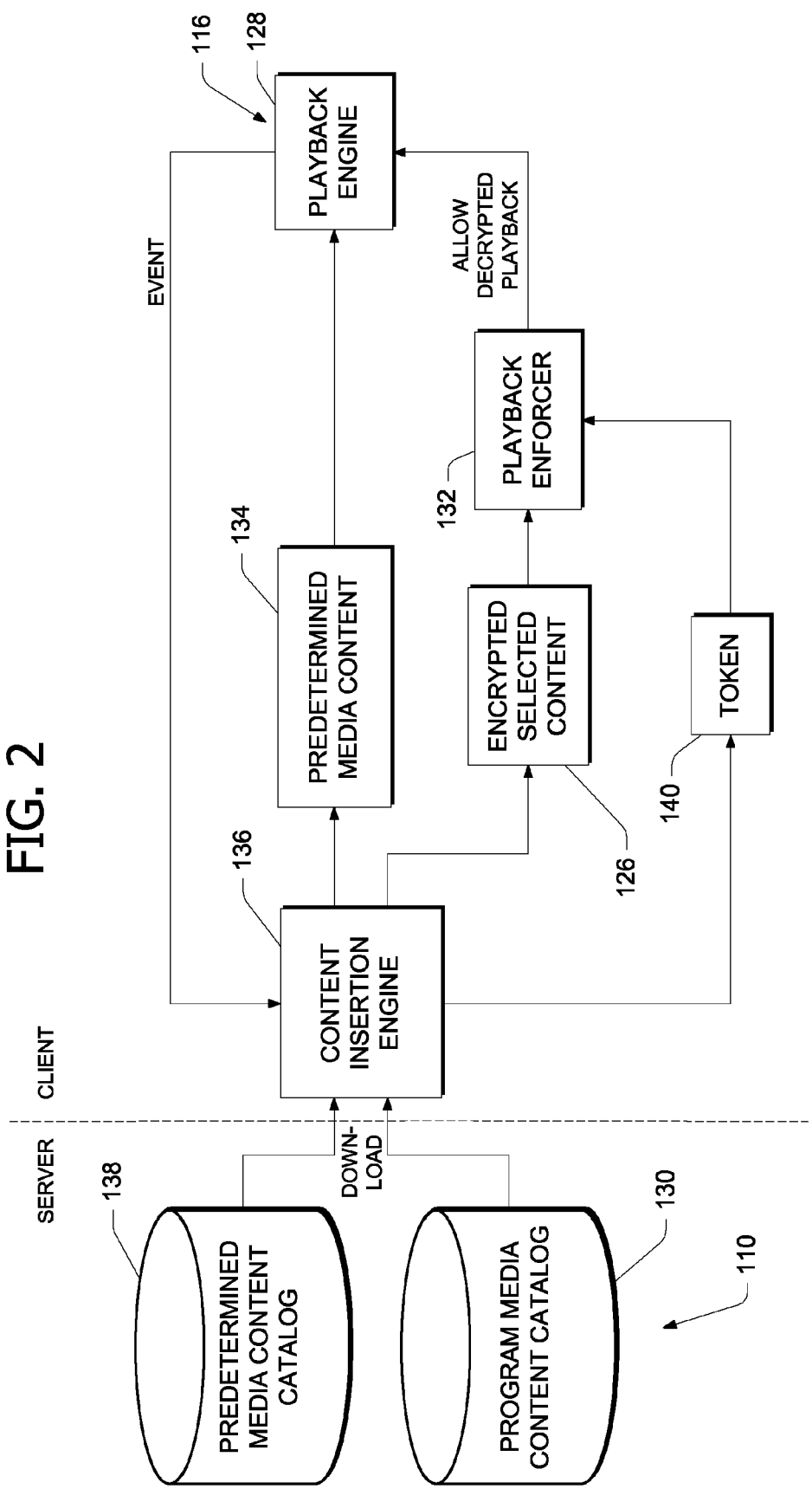
FIG. 2 is an exemplary block diagram illustrating a token-based content delivery and playback enforcement system according to aspects of the invention.

Referring next to FIG. 2, a block diagram shows an exemplary manner in which media system 100 performs client-based ad insertion. A content insertion and enforcement process embodying aspects of the invention begins when the user selects a content file 126 for downloading and rendering by a playback engine 128 (e.g., media player application 116). Advantageously, aspects of the invention provide an enforcement mechanism for ensuring that advertisements and other predetermined content may not be circumvented by the user when such files are downloaded to the user's computer 102. This enforcement mechanism deters the user from skipping, fast forwarding, fast reversing, or otherwise circumventing the rendering of the predetermined content file 134 by preventing playback of selected content file 126.

In one embodiment, the user selects the content file 126 from a catalog of available program media content 130 (e.g., database 110) available for download via remote media service 118. This selected content file 126 is encrypted in a manner such that a playback enforcer 132 (e.g., resident on the client) can prevent it from being played until certain conditions are met.

In addition to the selected media content 126, one or more predetermined media content files 134, such as video advertisements, are also downloaded to the user's computer 102 for rendering via playback engine 128. The ads may be randomly selected or targeted based on, for example, user information, or targeted based on the selected content. As shown in FIG. 2, a content insertion engine 136 retrieves the predetermined content file 134 from a library or catalog of advertisements or other predetermined content 138. The content insertion engine 136 is responsible for selecting predetermined content file 134 for playback and for scheduling its playback at an appropriate time. Advantageously, predetermined media content 134 is separate from selected media content 126 in one embodiment so that it may be changed according to an ad rotation schedule or otherwise targeted to a particular user. In one embodiment, computer 102 executes computer-executable instructions implementing content insertion engine 136. It is to be understood that content insertion engine 136 may be based on rules stipulated by server 108.

Once the content downloads are complete, the selected media content file 126 becomes available for decrypting and rendering by the playback engine 128. When the user selects the downloaded content for playback, an event is raised to the content insertion engine 136. In response to this event, content insertion engine 136 sends predetermined content file 134 to playback engine 128 for playback or otherwise instructs playback engine 128 to begin its playback. According to aspects of the invention, content insertion engine 136 also monitors the playback of predetermined content file 134 (see FIG. 3) and generates a playback token 140 in response to the advertisement or the like having been rendered. The content insertion engine 136 then sends this token to the playback enforcer 132 and schedules the selected media content file 126 for playback through the playback enforcer 132.

As the component responsible for decrypting selected media content file 126, playback enforcer 132 will not decrypt the content file 126 until it receives it a valid playback token 140, which includes a key for decrypting the selected content 126. Advantageously, aspects of the invention thus provide the benefits of higher quality video and the like associated with downloading media content while preventing the predetermined media content file 134 from being skipped or otherwise circumvented by the user during playback. Those skilled in the art are familiar with several encryption/decryption schemes that are suitable for implementing aspects of the invention.

In an alternative embodiment of the invention, content insertion engine 136 can interrupt the playback of content file 126 at any time to schedule an interstitial ad or the like. This causes the process to repeat from the selection and scheduling of predetermined content file 134. In other words, playback engine 128 is responsive to content insertion engine 136 for interrupting the rendering of the encrypted media content file 126 to render additional predetermined media content 134 to the user. The content insertion engine 136 generates another token 140 in response to the rendering of the additional predetermined media content 134 and playback enforcer 132 is responsive to receiving this other token 140 to permit the playback engine 128 to resume rendering the encrypted media content file 126.

It is to be understood that one or more ads or other predetermined media content files 134 may be scheduled for playback at any time relative to playback of selected media content file 126 (e.g., as bumper ads, interstitial ads, or both). In the context of audio files, for example, predetermined ad entry points may occur at selected song boundaries to enable a listening experience similar to radio.

In yet another alternative embodiment of the invention, playback token 140 may be implemented as a DRM license (see FIG. 5) where playback enforcer 132 embodies aspects of the underlying DRM system. In this embodiment, the DRM system requires that a license be present in response to the rendering of the predetermined content 134 before allowing playback of the selected content 126. In other words, the token 140 may be a DRM license where presence of the license allows playback to proceed and ensures that the predetermined content 134 was played and where absence of the license prevents playback. One suitable DRM mechanism may be implemented using Windows Media DRM, available from Microsoft Corporation.

Figure 3:
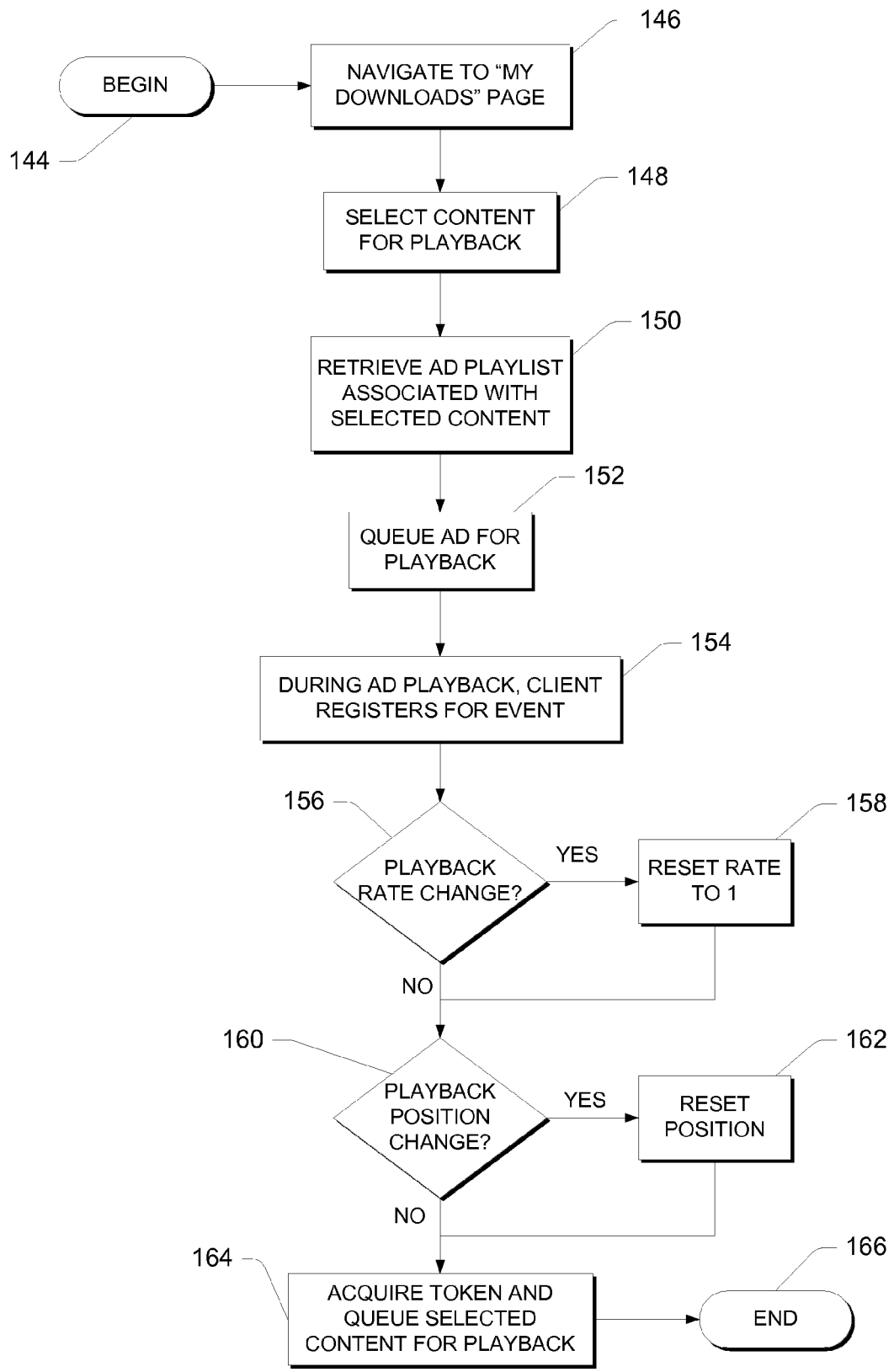
FIG. 3 is an exemplary flow chart illustrating content delivery and playback enforcement according to aspects of the invention.

Referring now to FIG. 3, an exemplary flow diagram, beginning at 144, illustrates insertion and enforcement of predetermined media content 134 according to aspects of the invention. In operation, the user navigates at 146 to a "My Downloads" page or other suitable starting point via user interface 120. At 148, the user selects media content, such as a video program, for playback. In response to the selection, the client (e.g., computing device 102) retrieves, at 150, an ad playlist from content insertion engine 136. Proceeding to 152, the client queues the first ad, i.e., predetermined media content 134, for playback. In one embodiment, the ad playlist is associated with this selected content 126.

It will be recognized by those skilled in the art that aspects of the invention may be implemented in a variety of software models, including an HTML application or a software add-in to an existing media player application 116. For example, the software add-in may provide a managed code plugin that has access to an object model by which it can invoke media player functions. Likewise, the HTML application may provide access to media player functions via an object model. In the HTML example, a MediaCenter.PlayMediaEx( ) method allows playback or queuing of a media file and a MediaCenter.Experience object allows the application to query and set the play rate of media. In the add-in example, a HostControl.PlayMedia( ) method and a MediaProperties class perform similar functions. This control includes the ability to set the playback rate and receive events related to reaching the end of media.

Referring further to FIG. 3, the client enforces that the ad plays to completion. At 154, while the ad is playing back, the client operations run in the background and register an event (e.g., MediaCenter.onPlayStateChange) that fires when the media being played (i.e., predetermined media content 134) changes state or rate. If the playback rate changes at 156, the client resets the rate to 1 at 158 using, for example, an Experience.PlayRate property of media player application 116. Proceeding to 160, if the playback position changes because the user has pressed fast forward or skip, the client resets the playback position at 162 to where it should have been at if the client had being playing at a playrate of 1. The client uses, for example, an Experience.MediaPosition property of media player application 116 to reset the playback position.

In another embodiment, the client enforces playback by disabling the transport controls of media player application 116 or simply requiring playback for a certain amount of time.

In yet another embodiment of the invention, the client may poll the playback engine for playback rate and playback position at some frequency (e.g., every second). If the polling reveals that the playback rate or position has changed, the client resets the rate or position to what it should be to ensure ad playback.

Aspects of the invention may also employ a time enforcement mechanism in which content insertion engine 136 does not provide the playback token 140 until a certain amount of time has elapsed (e.g., the duration of an ad being played). This effectively negates the benefits of skipping or fast forwarding through the ad.

Each time an ad plays, playback engine 128 executes an ad enforcement state machine, for example, to report this event to content insertion engine 136. The insertion engine 136, in turn, periodically reports the ad playback to a web service (e.g. externally to remote media service 118) for use in rotating the ads, generating tracking statistics, etc. Upon completion of the playback of predetermined media content 134 (or a few seconds before it ends), the client acquires token 140 in response to the playback event and queues the selected media content 126 for playback at 164 using, for example, the MediaCenter.PlayMediaEx method. The flow diagram of FIG. 3 then ends at 166.

As described above, content insertion engine 136 can interrupt the playback of content file 126 at any time to schedule additional, interstitial ads according to an alternative embodiment of the invention. This causes the process to repeat from the selection and scheduling of predetermined content file 134. As shown at 170 in FIG. 4, operations may continue from the operations illustrated in FIG. 3 at 164. The client sets a timer at 172 for the next ad insertion point in the selected video program. When this timer fires, as determined at 174, the client preempts or otherwise interrupts playback at 176 by switching to the next ad in the ad playlist using, for example, the MediaCenter.PlayMediaEx method. This operation occurs at 152 as shown in FIG. 3, where operations return at 178.

Figure 4:
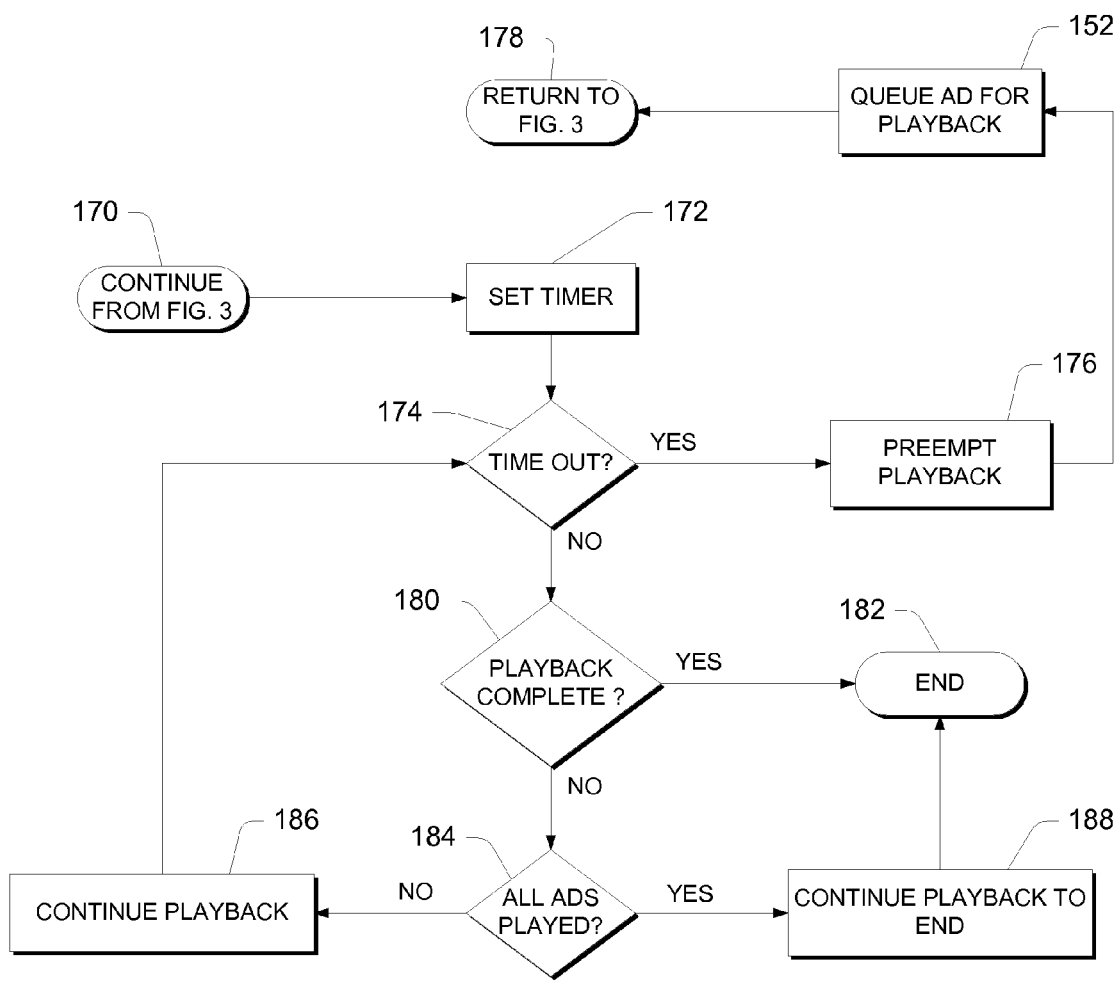
FIG. 4 is an exemplary flow chart illustrating content delivery and playback enforcement according to further aspects of the invention.

Referring further to FIG. 4, if playback of the selected media content 126 finishes before the timer has timed out, as determined at 180, the process ends at 182. If not, the process repeats for each ad in the ad playlist, as shown at 184. If additional ads remain in the ad playlist, playback of selected media content 126 continues at 186 until the timer fires. On the other hand, if all of the ads have been rendered, playback continues at 188 and ends at 182.

The semantics described above may be enforced using, for example, a state machine that executes in the background while playback is in progress.

Figure 5:
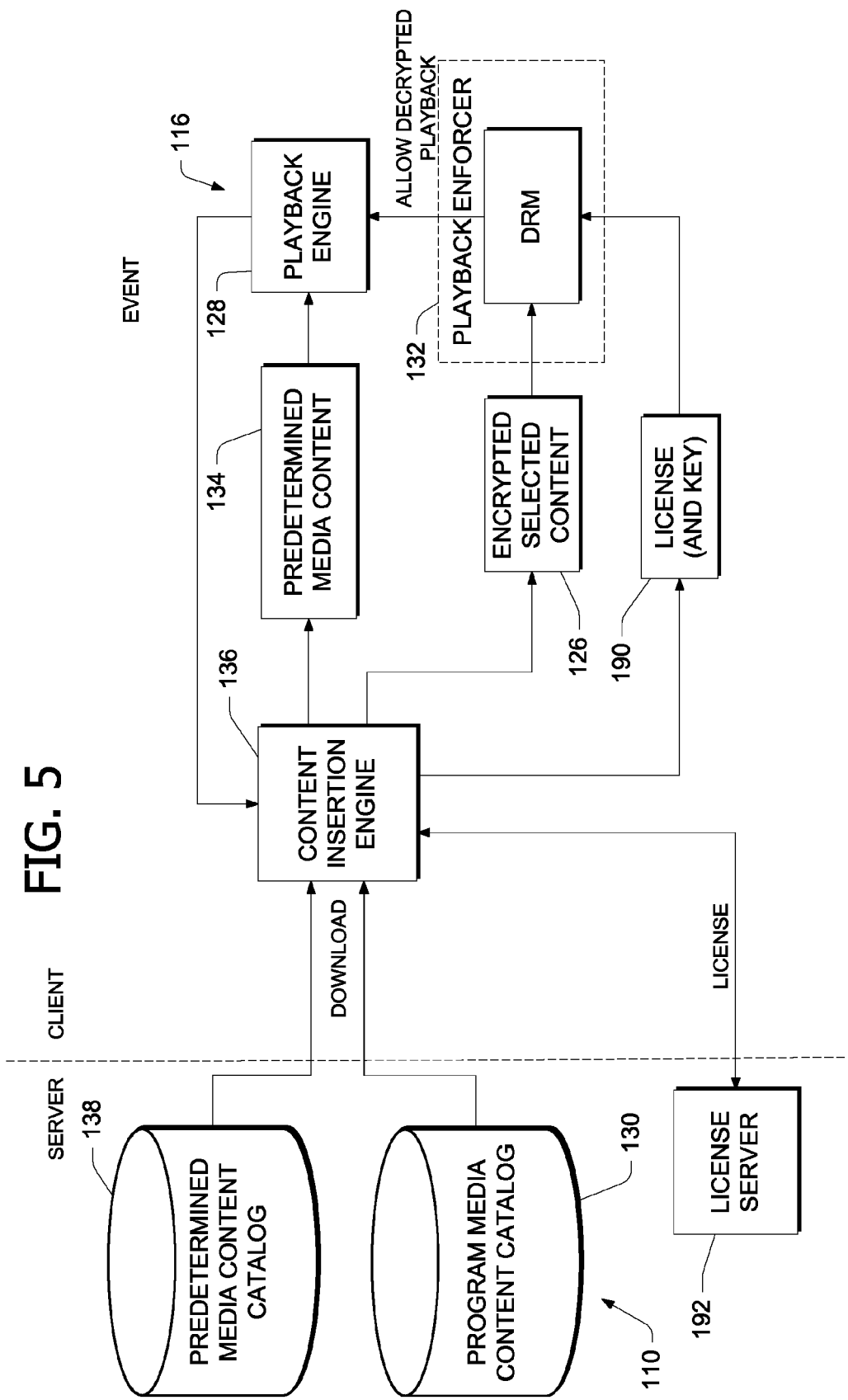
FIG. 5 is an exemplary block diagram illustrating a license-based content delivery and playback enforcement system according to aspects of the invention.

Referring now to FIG. 5, playback token 140 may be implemented as a DRM license 190 in an alternative embodiment of the invention. In this embodiment, the DRM system requires that the license 190 is present in response to the rendering of the predetermined content 134 before allowing playback of the selected content 126. For example, media player application 116 checks the header of selected media content file 126 to determine if it needs a key for playback. If so, media player application 116 checks with the DRM system, which in turn looks for a key identifier in a license store or obtains the key from a license server 192. The online video catalog stored at database 110 contains, for example, uniform resource locators (URLs) for the DRM license server 192. In this instance, the client executed on computing device 102 and the license server 192 share a common secret and the license server 192 only issues licenses 190 to this client. In one embodiment, each license 190 has a playcount of one, which is equivalent to a "play ticket" or "token". During playback, content insertion engine 136 provides license 190 to the DRM license store to allow playback of selected media content 126.

Figure 6:
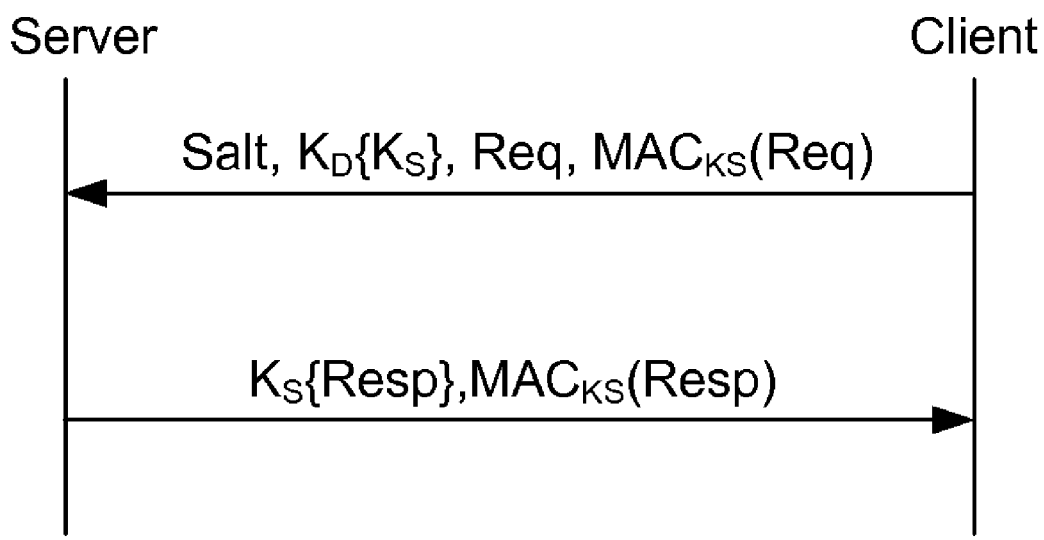
FIG. 6 is an exemplary digital rights management format according to aspects of the invention.

FIG. 6 illustrates an exemplary protocol that permits implementing playback token 140 as a DRM license 190. By this protocol, the client securely retrieves a license from the license server 192. In this instance, a shared secret ensures that only this client can retrieve the license 190. For example, the client (e.g., playback engine 128) and the server (e.g., content insertion engine 136) share a 128-bit secret key, KD. For each request, the client generates a random 128-bit key, KS, and a random 128-bit Salt. The client encrypts KS with KD using, for example, the advanced encryption standard (AES) in the electronic codebook (ECB) mode. The Salt value is XOR'ed with KS and the result is encrypted with AES ECB. In this example, the message authentication code (MAC) may be OMAC1. Other techniques for validating the identity of the client known to those skilled in the art, such as public key cryptography, may also be used to implement the protocol.

In operation, computer 102 executes computer-executable instructions such as those illustrated in the figures to implement aspects of the invention. In one embodiment, computer 102 receives a request via user interface 120 for the selected media content 126 to be rendered. Executing media player application 116 (or another playback engine 128), computer 102 first renders predetermined media content 134. In response, a token associated with the playback of predetermined media content 134 is generated, which, in turn, permits the selected media content 126 to be rendered. In an alternative embodiment, computer 102 acquires a DRM license associated with predetermined media content 134 and executes the acquired DRM license to permit playback of selected media content 126.

The exemplary operating environment illustrated in FIG. 1 includes a general purpose computing device (e.g., computing device 102) such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory.

Moreover, embodiments of the invention may be implemented with computer-executable instructions organized into one or more computer-executable components or program modules. Generally, these components or modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of enforcing rendering of predetermined media content in connection with rendering user selected media content to a user, said method comprising:
    receiving a request from a user to render the selected media content via a media player of a computing device;
    downloading to the computing device a selected content file in response to receiving the request from the user to render said selected media content, said selected content file including the selected media content;
    downloading to the computing device a predetermined content file in response to receiving the request from the user to render said selected media content, said predetermined content file being separate from the selected content file and including media content that is predetermined for rendering with the selected content file;
    rendering the predetermined media content of the predetermined content file to the user via the media player of the computing device;
    disabling transport controls of the media player for a predetermined period of time based on an expected length of time for rendering the predetermined media content;
    generating a token after the predetermined period of time, said token being separate from the predetermined content file and the selected content file;
    delivering the generated token to the computing device, said delivering comprising delaying delivery of the generated token for the predetermined period of time; and
    permitting the selected media content of the selected content file to be rendered to the user via the media player on the computing device only after the delayed delivery of the generated token to the computing device whereby rendering of the predetermined media content is enforced before rendering of the selected media content.

2. The method of claim 1, wherein the computing device is coupled to a network, and wherein said downloading the selected content file comprises downloading the selected content file to the computing device via the network.

3. The method of claim 2, further comprising encrypting the selected media content before downloading the selected media content.

4. The method of claim 3, wherein permitting the selected media content to be rendered comprises decrypting the encrypted selected media with the token.

5. The method of claim 1, wherein the predetermined media content is associated with the selected media content.

6. The method of claim 1, further comprising specifying, by a content insertion engine, the predetermined media content to be rendered in connection with the selected media content.

7. The method of claim 6, further comprising raising an event to the content insertion engine in response to receiving the request for the selected media content, said event triggering the rendering of the predetermined media content.

8. The method of claim 1, wherein the selected media content comprises a video program and the predetermined media content comprises targeted advertising associated with the video program.

9. The method of claim 1, further comprising:
    initially rendering the selected media content to the user via the media player of the computing device in response to the delivering of the generated token;
    interrupting the initial rendering of the selected media content;
    rendering additional predetermined media content to the user via the media player of the computing device;
    generating another token after the additional predetermined media content has been rendered, said generated other token different from the token delivered before said rendering of the selected media content;
    delivering the generated other token to the computing device; and
    permitting the selected media content to resume rendering to the user via the media player of the computing device only after said delivering of the generated other token to the computing device.

10. The method of claim 1, wherein the token comprises a DRM license.

11. A media system for rendering encrypted media content of a selected content file to a user, said system comprising:
    a playback engine for rendering media content to a user;
    a content insertion engine for specifying predetermined media content of a predetermined content file separate from the selected content file to be rendered to the user via the playback engine, said content insertion engine generating a token only in response to the playback engine having rendered the predetermined media content, wherein the predetermined content file and the selected content file do not comprise the generated token; and
    a playback enforcer for receiving the token generated by the content insertion engine after an expected length of rendering time of the predetermined media content and, responsive to receiving said token, decrypting the encrypted media content of the selected content file and permitting the playback engine to render the media content of the selected content file to the user, wherein the playback enforcer enforces rendering of the predetermined media content by disabling transport controls of the playback engine.

12. The media system of claim 11, wherein the content insertion engine schedules the predetermined media content for rendering to the user.

13. The media system of claim 11, further comprising a local computing device for executing the playback engine, said local computing device being coupled to a network, and wherein the encrypted media content and the predetermined media content are downloaded to the local computing device via the network.

14. The media system of claim 11, wherein the content insertion engine is responsive to an event for causing the predetermined media content to be rendered by the playback engine, said event being raised when the user selects encrypted media content to be rendered.

15. The media system of claim 11, wherein the encrypted media content comprises a video program and the predetermined media content comprises targeted advertising associated with the video program.

16. The media system of claim 11, wherein the playback engine is responsive to the content insertion engine for interrupting the rendering of the encrypted media content to render additional predetermined media content to the user, said content insertion engine generating another token in response to the rendering of the additional predetermined media content, and wherein the playback enforcer is responsive to receiving the other token to permit the playback engine to resume rendering the encrypted media content.

17. The media system of claim 11, wherein the playback enforcer comprises a DRM system and wherein the token comprises a DRM license.

18. A method of enforcing rendering of predetermined media content in connection with rendering selected media content to a user, said method comprising:
    receiving a request from the user to render selected media content of a first content file via a media player of a computing device;
    rendering predetermined media content of a second content file to the user via the computing device in response to receiving the request to render the selected media content of the first content file, said rendering comprising disabling transport controls of the media player for an expected length of rendering time of said predetermined media content;
    acquiring a DRM license associated with the selected media content only after the expected length of rendering time, said DRM license being generated by and acquired from a DRM license server in response to the predetermined media content having been rendered via the computing device, wherein the first content file and the second content file do not include said DRM license; and
    executing the acquired DRM license to permit the selected media content to be rendered to the user via the computing device.

19. The method of claim 18, wherein the predetermined media content is associated with the selected media content and further comprising downloading the second content file to the computing device in response to receiving the request for the selected media content.

* * * * *

UNITED STATES PATENT AND TRADEMARK OFFICE
CERTIFICATE OF CORRECTION

PATENT NO. : 7,836,511 B2
APPLICATION NO. : 11/424208
DATED : November 16, 2010
INVENTOR(S) : Aamer Hydrie et al.

Page 1 of 1

It is certified that error appears in the above-identified patent and that said Letters Patent is hereby corrected as shown below:

In Title page, in Item (57), under "ABSTRACT" column 2, line 1, after "rendering" insert -- of --.

Signed and Sealed this
Fifteenth Day of February, 2011

David J. Kappos
*Director of the United States Patent and Trademark Office*